United States Patent [19]
Shimazu et al.

[11] Patent Number: 5,835,304
[45] Date of Patent: Nov. 10, 1998

[54] MAGNETIC RECORDING/REPRODUCING DEVICE HAVING A MAGNETIC HEAD AND A LIFT ARM PRESSER ASSEMBLY WHEREIN A LIFT ARM PRESSING SPRING PRESSERS A LIFT ARM DOWNWARD AT A POINT CLOSER TO THE MAGNETIC HEAD THAN TO A MIDDLE POINT BETWEEN THE MAGNETIC HEAD AND A CENT

[75] Inventors: Teruo Shimazu, Atsugi; Toshiharu Shimizu, Machida; Yoshihide Majima, Hatano; Toshimitsu Itoh, Atsugi, all of Japan

[73] Assignee: Mitsumi Electric Co., Ltd., Tokyo, Japan

[21] Appl. No.: 861,864

[22] Filed: May 22, 1997

[30] Foreign Application Priority Data

May 22, 1996 [JP] Japan .................................. 8-127041

[51] Int. Cl.⁶ .............................. G11B 5/016; G11B 5/48

[52] U.S. Cl. ........................................ 360/99.01; 360/104
[58] Field of Search ................................... 360/104–105, 360/99.01–99.06

[56] References Cited

U.S. PATENT DOCUMENTS 5,463,512  10/1995  Hashimoto .............................. 360/104

*Primary Examiner*—A. J. Heinz
*Attorney, Agent, or Firm*—Frishauf, Holtz, Goodman, Langer & Chick

[57] ABSTRACT

A magnetic recording/reproducing device which incorporates a lift arm and presser assembly, wherein the lift arm and presser assembly includes a lift arm holding a magnetic head, a carriage attached with the lift arm which is movable relative to the carriage, and a lift arm pressing spring attached to the carriage for pressing the lift arm. The lift arm pressing spring presses the lift arm at a position closer to the magnetic head than to a middle point between the magnetic head and a center portion of the lift arm.

5 Claims, 3 Drawing Sheets

MAGNETIC RECORDING/REPRODUCING DEVICE HAVING A MAGNETIC HEAD AND A LIFT ARM PRESSER ASSEMBLY WHEREIN A LIFT ARM PRESSING SPRING PRESSERS A LIFT ARM DOWNWARD AT A POINT CLOSER TO THE MAGNETIC HEAD THAN TO A MIDDLE POINT BETWEEN THE MAGNETIC HEAD AND A CENT

BACKGROUND OF THE INVENTION

The present invention relates to a magnetic recording/reproducing device, such as a flexible disk drive and, in particular, to a presser assembly for a lift arm holding a magnetic head in the magnetic recording/reproducing device.

As is well known in the art, a flexible disk drive is a magnetic recording/reproducing device for performing data recording and reproducing relative to a flexible disk inserted therein.

The magnetic recording/reproducing device of the type described comprises a disk holder or tray for carrying the flexible disk. The disk holder is moved inwardly and outwardly at insertion and ejection of the flexible disk. Further, the disk holder moves downwardly to position the flexible disk into a driving position and moves upwardly to take the flexible disk out of the driving position. The device further comprises a magnetic head for data writing to and data reading from a magnetic recording medium, and a carriage for carrying the magnetic head in a radial direction of the magnetic recording medium loaded in the device. The carriage is provided with a lift arm elastically supported thereon at one end and holding the magnetic head at a free end thereof, and a spring member mounted thereon to elastically press the lift arm at a middle point of the lift arm length to press down the lift arm so as to bring the magnetic head into contact with the flexible disk. During a time other than when the disk holder is lowered, the lift arm engages with a projection of the disk holder and is thereby lifted up to allow the magnetic head to be lifted up and not to engage with the flexible disk being inserted or ejected. When the disk holder is lowered to bring the flexible disk into the driving position, the projection goes out of the lift arm, and then the lift arm is pressed down by the spring member so that the magnetic head is pressed onto the flexible disk.

In an assembly of the lift arm and the pressing spring in the known magnetic recording/reproducing device, the lift arm pressing spring presses the lift arm at the middle point or center portion thereof, and a sufficient force is not applied to the magnetic head from the pressing spring through the lift arm so that stable engagement of the magnetic head relative to a magnetic recording medium can not be ensured.

SUMMARY OF THE INVENTION

Therefore, it is an object of the present invention to provide a lift arm and presser assembly in a magnetic recording/reproducing device, wherein a lift arm pressing spring stably applies a pressing force to a magnetic head to ensure a reliable head touch of the magnetic head relative to a magnetic recording medium.

According to one aspect of the present invention, a lift arm presser assembly of a magnetic recording/reproducing device comprises a lift arm holding a magnetic head; a carriage attached with the lift arm which is movable relative to the carriage; and a lift arm presser spring attached to the carriage for pressing the lift arm, wherein the lift arm presser spring presses the lift arm at a position closer to the magnetic head than to a middle point between the magnetic head and a center portion of the lift arm.

It may be arranged that the lift arm presser spring is attached to the carriage at a coiled portion thereof.

BRIEF DESCRIPTION OF THE DRAWINGS

The present invention will be understood more fully from the detailed description given hereinbelow, taken in conjunction with the accompanying drawings.

In the drawings:

FIGS. 1A–1C are diagrams showing a lift arm and presser assembly and a carriage position detecting device of a flexible disk drive according to a preferred embodiment of the present invention, wherein FIG. 1A is a plan view, FIG. 1B is a left-side view and FIG. 1C is a rear view;

FIGS. 2A and 2B are enlarged diagrams of the lift arm and presser assembly shown in FIGS. 1A–1C, wherein FIG. 2A is a plan view and FIG. 2B is a right-side view.

DESCRIPTION OF THE PREFERRED EMBODIMENT

Now, a preferred embodiment of the present invention will be described in detail hereinbelow with reference to the accompanying drawings.

Referring to FIGS. 1A to 3, a flexible disk drive provided with a lift arm and presser assembly according to the preferred embodiment of the present invention will be described.

Figure 3:
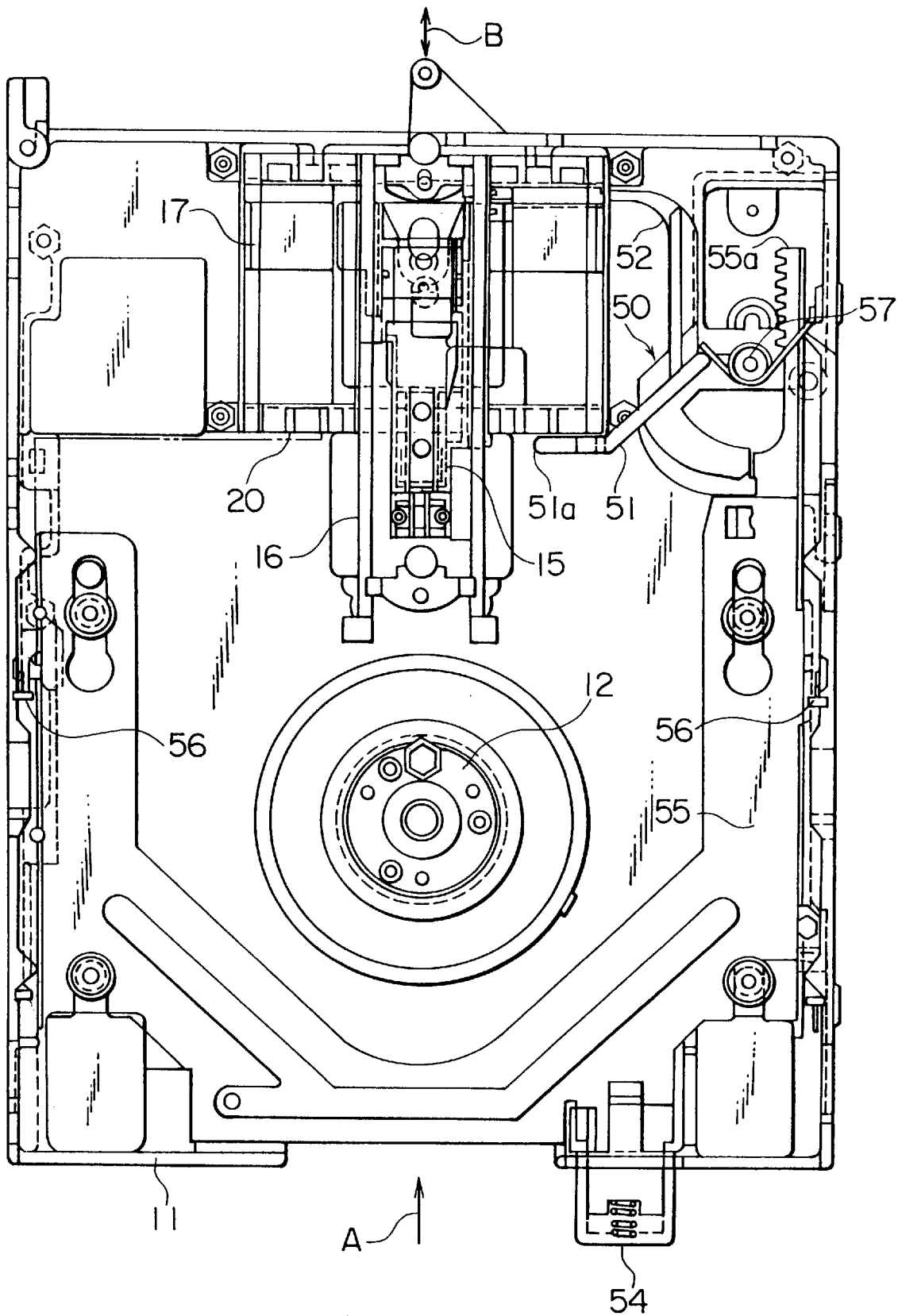
FIG. 3 is a plan view showing a flexible disk drive incorporating the lift arm and presser assembly and the carriage position detecting device shown in FIGS. 1A–1C.

The shown flexible disk drive (FDD) is a device for performing data recording and reproducing relative to a flexible disk (not shown). The flexible disk is carried by a disk holder (not shown) and inserted into the flexible disk drive in a direction A in FIG. 3. FIG. 3 shows the state where the flexible disk is loaded in the flexible disk drive.

The loaded flexible disk is held on a disk table assembly 12 with their center axes coinciding with each other. The disk table assembly 12 is rotatably supported on the surface of a main frame 11 of the flexible disk drive. The disk table assembly 12 is rotated by a drive motor (not shown) provided on the underside of the main frame 11 so as to rotate the flexible disk. Further, a board (not shown) mounted with a number of electronic components is attached to the underside of the main frame 11.

The flexible disk drive includes a magnetic head 13 for carrying out data reading and writing relative to the flexible disk. The magnetic head 13 is held by a carriage 15 via a lift arm 14. A unit comprising the magnetic head 13, the lift arm 14 and the carriage 15 is called a carriage assembly. The carriage 15 is arranged over and spacing from the surface of the main frame 11 and holds the magnetic head 13 to be movable in a predetermined radial direction, as shown by arrows B in FIG. 3, with respect to the flexible disk.

Figure 2A:
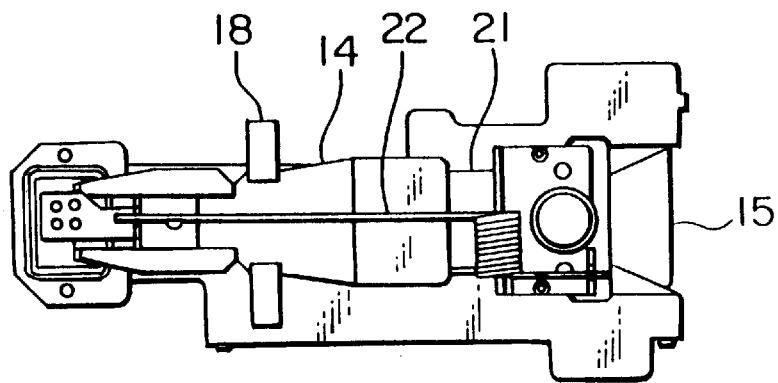
Figure 2B:
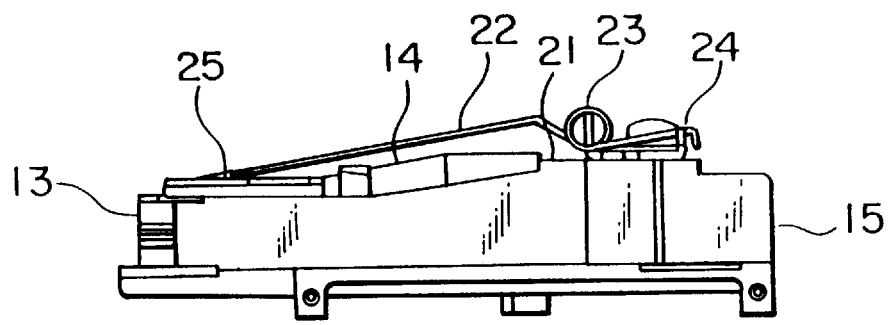

A detailed structure of the lift arm and presser assembly is shown in FIGS. 2A and 2B. The lift arm 14 holding the magnetic head 13 is attached at its right end (FIGS. 2A and 2B) to the carriage 15 via a plate spring 21. A lift arm pressing spring 22 is attached to the carriage 15 at a coiled portion 23 as a fulcrum. The lift arm presser spring 22 abuts the carriage 15 and raised upward at its right end portion 24, and presses downward the lift arm 14 at its left end portion 25 near an upper end of the magnetic head 13. Specifically, the lift arm presser spring 22 presses downward the lift arm 14 at a position closer to the magnetic head 13 than to a middle point between the magnetic head 13 and a center portion of the lift arm 14. The lift arm 14 is provided with a pair of laterally protruding portions 18 which are in abutment with a disk holder (not shown) and is lifted up in the similar manner as in the prior art when the disk holder is inserted into and ejected from the device, as described in the Background of the Invention.

On both sides, the carriage 15 is supported and guided at its lower ends by a pair of guide bars 16 extending in parallel to the predetermined radial direction B. A pair of rubber dampers 41, each having an O-ring structure, are fixed on each of the guide bars 16 at both axial end portions thereof. With this arrangement, the pair of rubber dampers 41 on each guide bar 16 work to stop the excessive movement of the carriage 15 in both directions depicted by the arrows B without causing a shock.

The carriage 15 is driven in the predetermined radial direction B by a voice coil motor. The voice coil motor includes a pair of voice coils 17 disposed rearward of the carriage 15 and each wound around a drive shaft extending in parallel to the foregoing predetermined radial direction B, and magnetic circuits 20 each for producing a magnetic field intersecting the electric current flowing through the corresponding voice coil 17. With this arrangement, when the electric current is caused to flow through each of the voice coils 17 in a direction intersecting the magnetic field produced by the magnetic circuit 20, a drive force is generated in an extending direction of the drive shaft based on interaction between the electric current and the magnetic field. The generated drive forces cause the carriage 15 to move in the foregoing predetermined radial direction B.

The flexible disk drive includes a shutter drive mechanism for opening and closing a shutter (not shown) of the flexible disk, an eject mechanism for ejecting the loaded flexible disk from the flexible disk drive, and a carriage lock mechanism for locking the carriage 15 after ejecting the flexible disk.

A lever unit 50 includes an eject lever 51 and a lock lever 52. The eject lever 51 doubles as an element of the foregoing shutter drive mechanism and an element of the foregoing eject mechanism. The lock lever 52 is arranged near the carriage 15 for locking the carriage 15 upon ejecting the flexible disk.

The eject mechanism includes an eject button 54 protruding from a front bezel (not shown) of the flexible disk drive, an eject plate 55 for positioning the flexible disk inserted via an insertion slot (not shown) of the front bezel such that one side of the flexible disk faces the eject plate 55, and an eject spring 56 having one end engaging with the eject plate 55 and the other end engaging with a disk holder unit (not shown). The eject plate 55 is provided with a rack 55a at its tip in an insertion direction of the flexible disk. The rack 55a meshes with a pinion (not shown) rotatably supported on the surface of the main frame 11. The lever unit 50 is biased by a spring mechanism 57 in a counterclockwise direction.

When the flexible disk is inserted into the flexible disk drive in the direction A in FIG. 3, a tip 51a of the eject lever 51 engages with a right-upper end of the shutter and the lever unit 50 rotates in a clockwise direction following the movement of the flexible disk. Following this, the shutter is caused to slide by the tip 51a of the eject lever 51.

When the flexible disk is fully received in the flexible disk drive, the flexible disk is held in the disk holder unit by a disk lock mechanism (not shown).

Figures 1A, 1B:
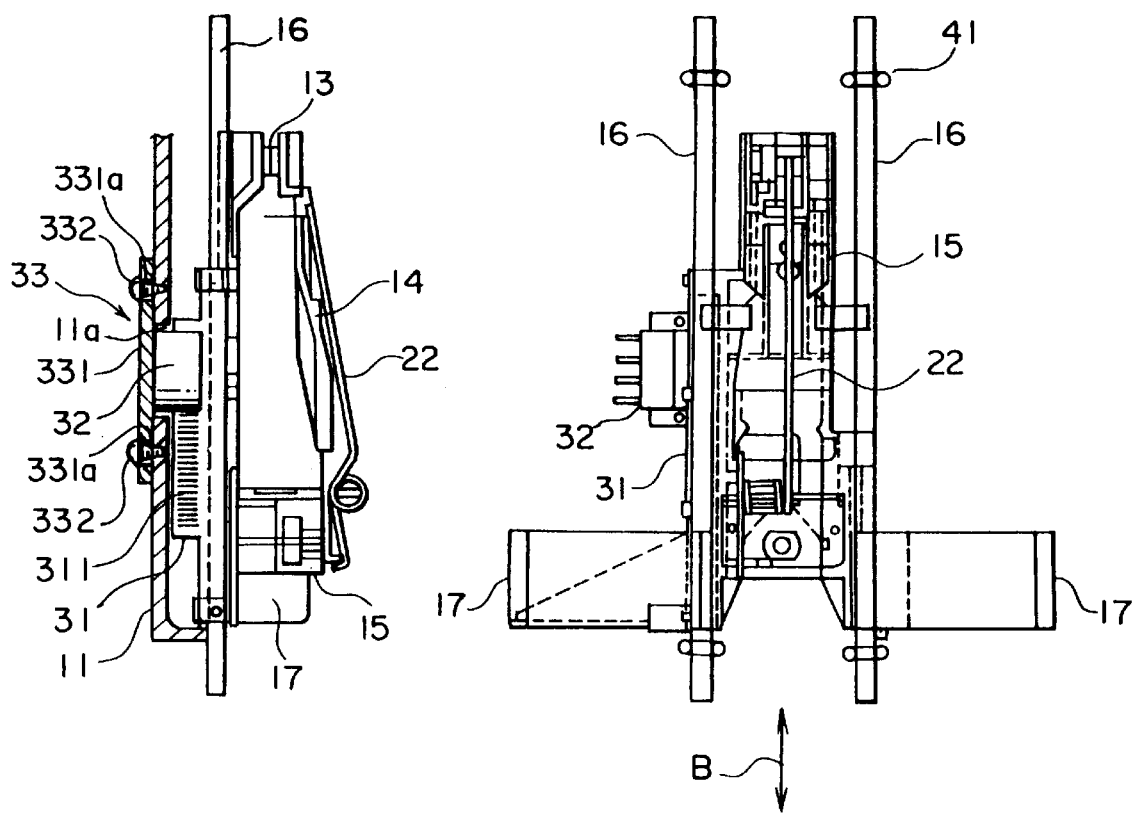
Figure 1C:
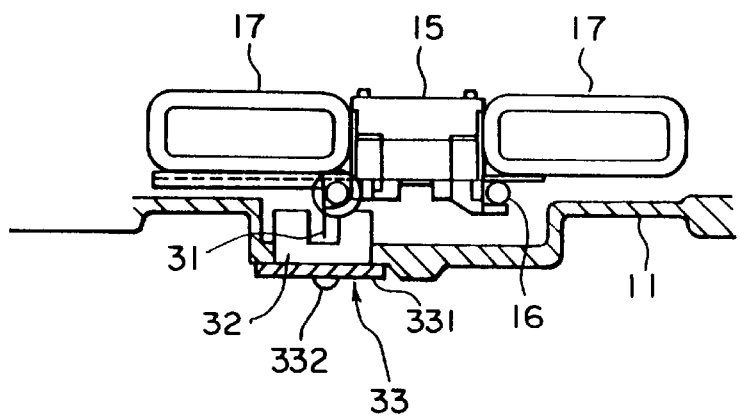

FIGS. 1A–1C show the lift arm and presser assembly with a carriage position detecting device of the flexible disk drive according to the preferred embodiment of the present invention, wherein FIG. 1A is a plan view, FIG. 1B is a left-side view and FIG. 1C is a rear view.

The carriage position detecting device includes a scale 31 secured to one side of the carriage 15 confronting the main frame 11, and a photointerrupter 32 mounted on the main frame 11. The scale 31 is formed with slits 311 arranged at regular intervals in the predetermined radial direction B. The photointerrupter 32 includes a light emitting portion (not shown) and a light receiving portion (not shown) confronting each other with the scale 31 interposed therebetween. The light emitting portion is composed of one light emitting diode, while the light receiving portion is composed of a plurality of light receiving elements arranged in the predetermined radial direction B with phase differences of 90°.

As shown in FIG. 1B, the carriage position detecting device further includes an alignment adjust mechanism 33 for carrying out an alignment adjustment by adjusting a position of the photointerrupter 32 i n the predetermined radial direction B. The photointerrupter 32 is provided at an opening 11a of the main frame 11. The opening 11a has a size for allowing a positional adjustment of the photointerrupter 32 in the predetermined radial direction B. The alignment adjust mechanism 33 includes a base plate 331 on which the photointerrupter 32 is fixedly mounted, and at least two screws 332 for fixing the base plate 331 to the main frame 11. The base plate 331 is formed with at least two elongate holes 331a extending in the predetermined radial direction B. The base plate 331 is fixed to the main frame 11 by the screws 332 received through the corresponding elongate holes 331a. With the thus structured alignment adjust mechanism 33, the positional adjustment of the photo-interrupter 32 in the predetermined radial direction B can be achieved.

In the carriage position detecting device having the foregoing structure, the light emitted from the light emitting portion of the photointerrupter 32 is received at the light receiving portion of the photointerrupter 32 via the slits 311 of the scale 31. Accordingly, by counting the number of the lights received at the light receiving portion, a current position of the carriage 15 can be detected.

As described above, according to the foregoing preferred embodiment, since the lift arm pressing spring 22 presses downward the lift arm 14 at a position closer to the magnetic head 13 than to the middle point between the magnetic head 13 and the center portion of the lift arm 14, the lift arm pressing spring 22 can stably apply a force to the lift arm 14. Accordingly, the improved lift arm and presser assembly of the magnetic recording/reproducing device can be provided, which ensures the reliable engagement of the magnetic head 13 relative to the magnetic recording medium.

While the present invention has been described in terms of the preferred embodiment, the invention is not to be limited thereto, but can be embodied in various ways without departing from the principle of the invention as defined in the appended claims.

What is claimed is:

1. A magnetic recording/reproducing device comprising:
   a magnetic head for writing data to and reading data from a magnetic recording medium which is loaded in the magnetic recording/reproducing device;
   a lift arm holding a magnetic head at a first end portion thereof;
   a carriage attached to said lift arm at a second end portion of the lift arm opposite to the first end portion of the lift arm, said lift arm being bendable at the second end portion to thereby enable said magnetic head to move apart from said magnetic recording medium which is loaded in the magnetic recording/reproducing device; and a lift arm pressing spring mounted to said carriage for pressing said lift arm at a position closer to said magnetic head than to a middle point between said magnetic head and a center portion of said lift arm, to thereby engage said magnetic head with said magnetic recording medium.

2. A magnetic recording/reproducing device as claimed in claim 1, wherein said lift arm pressing spring comprises a coiled portion, and said lift arm pressing spring is attached to said carriage at said coiled portion.

3. A magnetic recording/reproducing device as claimed in claim 1, wherein said lift arm pressing spring is mounted to one side of said carriage, and wherein the magnetic recording/reproducing device further comprises:

a main frame having a surface, said carriage being supported at its side opposite to the side of the lift arm pressing spring by a pair of guide bars, said guide bars being arranged on the surface of the main frame; and a carriage position detecting device connected to the main frame and to said carriage for detecting a current position of said carriage.

4. A magnetic recording/reproducing device as claimed in claim 3, wherein said carriage position detecting device includes:

a scale secured to the side of said carriage opposite to the side of the lift arm spring;

a photointerrupter mounted on said main frame; and an alignment adjustment mechanism for adjusting a position of the photointerrupter in a radial direction.

5. A magnetic recording/reproducing device as claimed in claim 3, further comprising dampers being fixed on each of the guide bars to prevent excessive movement of said carriage.

* * * * *

UNITED STATES PATENT AND TRADEMARK OFFICE
CERTIFICATE OF CORRECTION

PATENT NO. : 5,835,304

DATED : November 10, 1998

INVENTOR(S) : Shimazu, et al.

It is certified that error appears in the above-identified patent and that said Letters Patent is hereby corrected as shown below:

In the title Item [54], line 5, change "PRESSERS" to --PRESSES--.

In the title Item [54], line 8, after "A" delete "CENT" and insert-- CENTER PORTION OF THE LIFT ARM--.

Signed and Sealed this

Ninth Day of March, 1999

*Attest:*

Q. TODD DICKINSON

*Attesting Officer*     *Acting Commissioner of Patents and Trademarks*